March 9, 1965 J. A. WOOD 3,172,188

METHOD OF MANUFACTURE OF SEMICONDUCTOR DEVICES

Filed Oct. 30, 1961 2 Sheets-Sheet 1

INVENTOR.
JAMES A. WOOD
BY David M. Keay
AGENT.

March 9, 1965 J. A. WOOD 3,172,188

METHOD OF MANUFACTURE OF SEMICONDUCTOR DEVICES

Filed Oct. 30, 1961 2 Sheets-Sheet 2

INVENTOR.
JAMES A. WOOD
BY
David M. Keay
AGENT.

3,172,188

METHOD OF MANUFACTURE OF SEMICONDUCTOR DEVICES

James A. Wood, Goffstown, N.H., assignor to Sylvania Electric Products Inc., a corporation of Delaware Filed Oct. 30, 1961, Ser. No. 148,562
5 Claims. (Cl. 29—25.3)

Figures 1, 2:
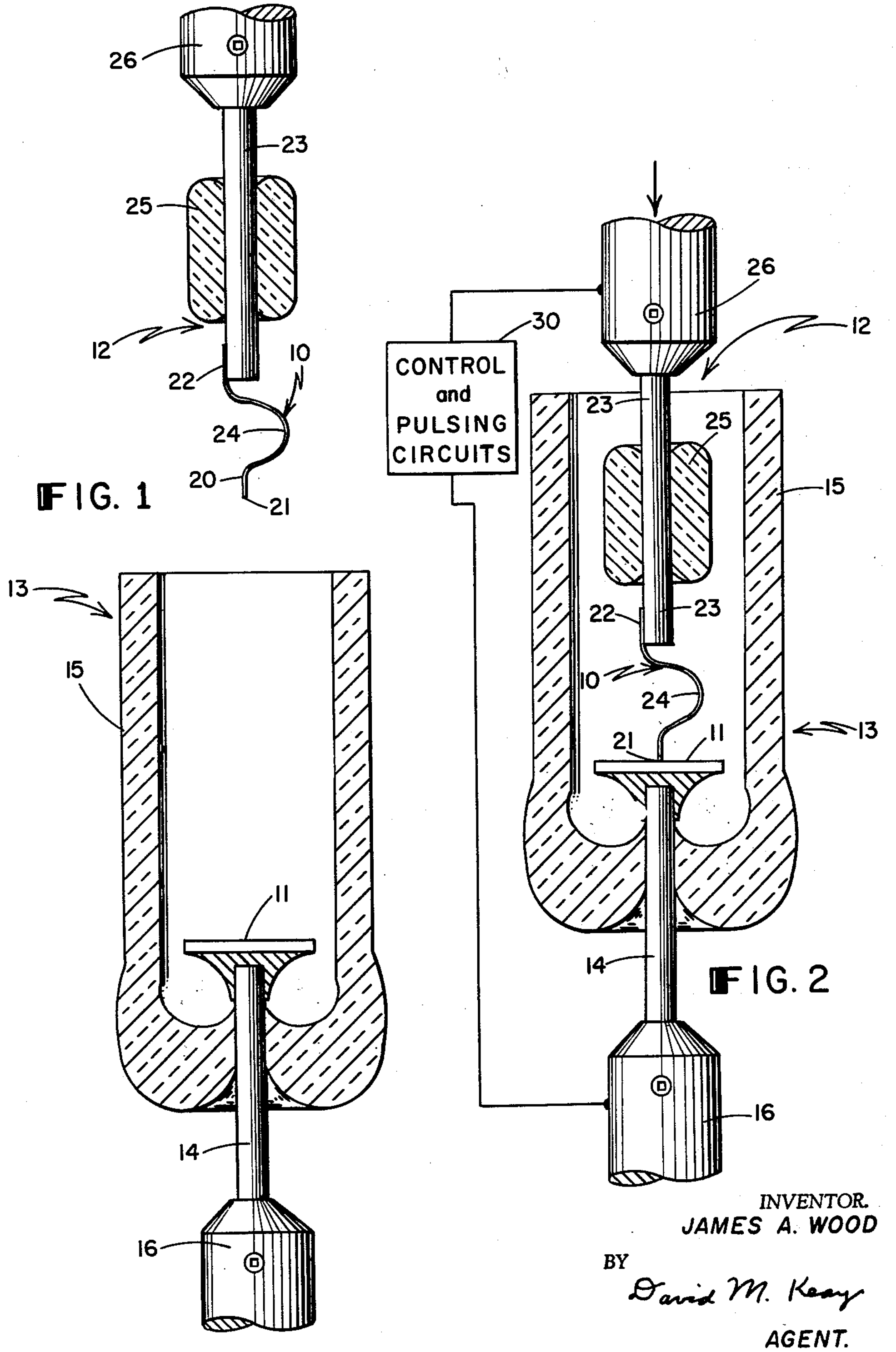

This invention relates to semiconductor devices. More particularly, it is concerned with methods of fabricating semiconductor devices of the type having a small area electrode making rectifying contact to a body of semiconductor material.

Semiconductor diodes which employ a small area electrode making rectifying contact to a body of semiconductor material are well known. One such type of semiconductor diode employs a catwhisker electrode having one end bonded or welded to a surface of the body of semiconductor material so as to produce a rectifying contact. The electrode is commonly a length of gold wire having a loop or curved section intermediate two straight sections. The electrode is bonded to the body of semiconductor material by moving one end of the electrode into contact with the surface of the body of semiconductor material, compressing the loop to press the end of the electrode against the surface, and then passing sufficient electrical current through the body and the electrode so as to fuse them together thereby forming a rectifying contact.

The enclosure or housing most commonly employed for such "gold-bonded diodes" is in the form of a glass cylinder. Prior to the bonding operation a short length of glass tubing is sealed to the lead on which the body of semiconductor material is mounted. After the electrode is bonded to the body of semiconductor material the glass tubing is sealed to a glass bead on the lead attached to the electrode. The sealing operation is performed immediately after the rectifying bond is made without disturbing the relative positions of the electrode and semiconductor body, thereby fixing the relative positions of all parts.

It has been found that semiconductor diodes of the foregoing type are subject to failure by rupture of the bond between the electrode and the body of semiconductor material when a diode is subjected to relatively high forces of shock or acceleration. Encapsulation of the semiconductor body and the attached electrode in plastic in order to provide support for the bond has not proven feasible because of the small size of the device, the fragility of the electrode and the bond, and the problem of obtaining access to the interior of the device after the bond has been made.

Attempts have been made to improve the shock resistance of this type of diode by the use of a straight electrode, thus eliminating the resilient loop section. However, during assembly of a straight electrode to the body of semiconductor material it frequently occurs that the electrode skids along the surface of the body either at initial contact or under the influence of the pulse of electric current. The resulting fused connection is generally unsatisfactory both electrically and mechanically.

It is an object of the invention, therefore, to provide a method for producing an improved small area rectifying semiconductor device.

It is a more specific object of the invention to provide a method for making a small area rectifying semiconductor diode which is highly resistant to shock and acceleration.

Briefly, in accordance with the objects of the invention a semiconductor device is fabricated by contacting the surface of a body of semiconductor material with one end of an electrode having a curved section along its length. The end of the electrode is bonded to the surface of the body of semiconductor material in order to establish rectifying connection thereto. The opposite end of the electrode is withdrawn from the body of semiconductor material while the electrode remains bonded to the body thereby partially straightening the curved section of the electrode. The relative positions of all sections of the electrode and the body of semiconductor material are then fixed by rigidly attaching the opposite end of the electrode with respect to the enclosure supporting the body of semiconductor material.

Additional objects, features, and advantages of the invention will be apparent from the following detailed discussion and the accompanying drawings wherein:

FIG. 1 is an elevational view partially in cross-section illustrating the electrode and semiconductor body subassemblies of a semiconductor diode held in position for assembly according to the method of the invention, FIG. 2 is an elevational view partially in cross-section illustrating the electrode and semiconductor body subassemblies at one stage during the fabrication of the diode after the electrode has been placed in contact with the semiconductor body.

Figure 3:
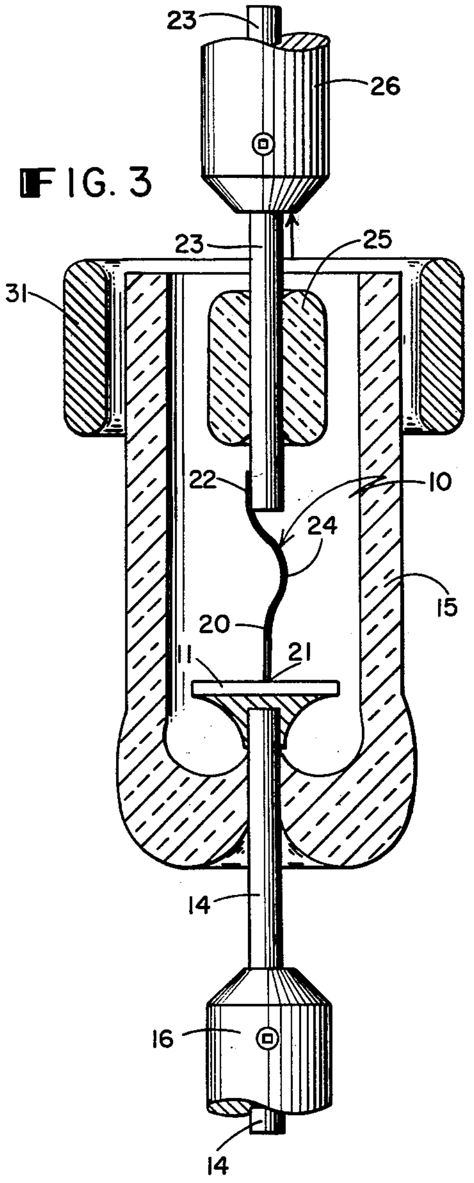
Figure 4:
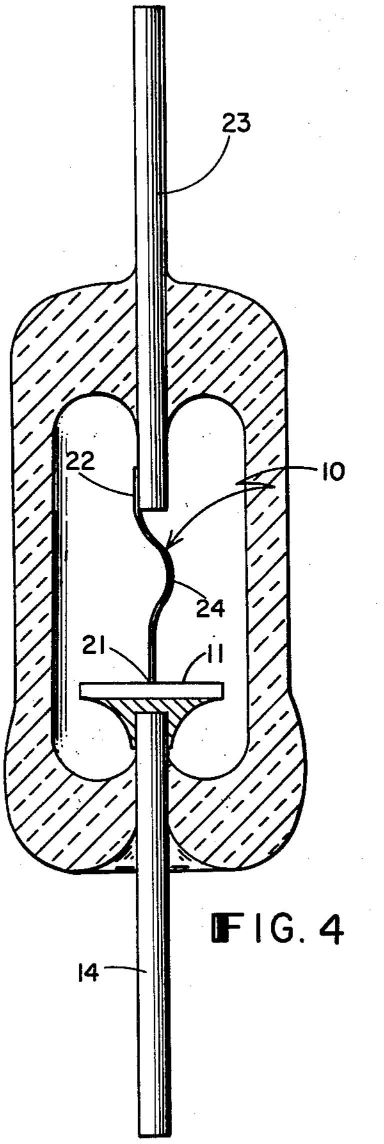

FIG. 3 is an elevational view partially in cross-section illustrating the parts of the semiconductor diode after one end of the electrode has been bonded to the semiconductor body and the other end has been withdrawn from the body in order to partially straighten the electrode, and FIG. 4 is a cross-sectional view of a completed semiconductor diode fabricated according to the method of the invention.

The parts of a semiconductor diode are illustrated in FIG. 1 in preparation for bonding of the electrode 10 to the body of semiconductor material 11 and sealing of the electrode and semiconductor body within an enclosure. The parts previously have been combined into an electrode subassembly 12 and a semiconductor body subassembly 13. The semiconductor body or die 11 is mounted on a lead 14 with an ohmic connection. The lead, in turn, is sealed to one end of a hollow cylindrically-shaped glass member 15 which constitutes the major portion of the enclosure for the diode. The lead is held in a chuck 16 of the assembly apparatus during assembly of the subassemblies according to the method of the invention.

The filamentary catwhisker electrode 10 includes a first straight section 20 having one end 21 and a straight second section 22 which is welded to a lead 23. The straight sections are parallel to each other and the first straight section lies generally along the axis of the lead. Intermediate the two straight sections is a loop or curved section 24. A glass bead 25 which forms a portion of the enclosure of the final device is sealed to the lead. The electrode lead is held in an upper chuck 26 of the apparatus for assembling the diode. The upper chuck positions the electrode subassembly with the end of the electrode directly above the flat upper surface of the semiconductor die.

As shown in FIG. 2 the chuck 26 holding the electrode subassembly 12 is lowered to place the end 21 of the electrode in contact with the semiconductor die 11. Control and pulsing circuits 30 illustrated in block diagram form in FIG. 2 are connected between the two chucks which are otherwise electrically insulated from each other. This circuitry automatically controls movement of the upper chuck toward the lower chuck; and when the circuit is completed by establishment of contact between the end of the electrode and the semiconductor die, the upper chuck is advanced an additional precisely predetermined small distance. This movement of the electrode lead establishes a predetermined contact pressure of the end of the electrode against the die by compressing the loop or curved section 24 of the electrode from its normal configuration. Electrical current of sufficient magnitude to cause welding or bonding of the electrode and the semiconductor die is then passed through the device from the control and pulsing circuits 30. The electrode is thereby fused to the semiconductor die in a small area rectifying contact as is well understood in the semiconductor art.

Following the bonding step, the electrode lead chuck 26 is withdrawn upward a predetermined distance as illustrated in FIG. 3. The end 21 of the electrode which has been bonded to the semiconductor die remains fused to the die. The electrode is stretched out by the withdrawal of the upper straight section 22 and the loop section 24 is partially straightened increasing its radius of curvature. The portion of the loop lying farthest from the straight sections of the electrode is moved closer to the axis of the lower straight section and the lead thus reducing the moment of inertia of the loop section about the fused connection. After retraction of the chuck together with the electrode lead and the upper straight section of the electrode, the process of assembling the diode is completed by the sealing of cylindrical glass member 15 to the bead 25. This operation is performed in a known manner as by the use of a resistance heating ring 31 while the chucks and the parts of the device maintain their positions with respect to each other.

The completed device after the die and bonded electrode have been sealed within the enclosure is illustrated in FIG. 4. The upper straight section 22 of the electrode which was withdrawn from the semiconductor die is fixed in position with respect to the die by the rigid assembly of the leads and the glass enclosure. The curved section 24 of the electrode is partially straightened from its original configuration, although in most instances it still has a bend along its length, and the moment of inertia of the electrode about the axis of the lead and the lower straight section of the electrode is greatly reduced.

The fused junction of the end 21 of the electrode and the semiconductor die is a rectifying junction. If during the formation of the junction a weak mechanical bond is obtained, the step of retracting the upper section of the electrode will cause the connection to break. Thus, defective junctions which otherwise might go undetected during fabrication and inspection of the device are made apparent by the process described. Bonds which are electrically and mechanically satisfactory are not adversely affected by the operation of straightening the electrodes.

In a typical example of fabricating a diode according to the method of the invention an electrode 10 of gold-gallium wire was bonded to a die 11 of germanium containing antimony as the N-type conductivity imparting material. The electrode was a length of .002 inch diameter wire of 99% gold and 1% gallium. The wire was formed so as to provide a curved section 24 intermediate a first straight section 20 of .025 inch length and a second straight section 22 of approximately the same length. The curved section extended along the length of the formed electrode a distance of .040 inch and at its farthest point was .025 inch from the axis of the lead and the first straight section. The radius of curvature of the major curve of the loop section was about .010 inch. The second straight section of the electrode was welded to a dumet lead .020 inch in diameter. The germanium die was a rectangular wafer .040 by .040 by .003 inch. It was soldered to the end of a dumet lead .020 inch in diameter.

The chuck holding the electrode subassembly was advanced toward the die until electrical contact was made with the die. The chuck was then further advanced a distance of .001 inch thus establishing a contact resistance of the order of 1 megohm between the electrode and die. An electrical square wave pulse of 1.5 amperes was passed through the electrode and the semiconductor die for a period of 300 milliseconds in order to fuse the end of the electrode to the die. Following the pulsing step, the upper chuck was withdrawn a distance of .030 inch in order to partially straighten the curved section of the electrode. The glass member 15 of the die subassembly was then sealed to the glass bead 25 of the electrode subassembly providing a sealed semiconductor diode having outside dimensions of approximately .100 inch in diameter and .265 inch long, exclusive of the leads.

Semiconductor diodes fabricated as above were subjected to centrifugal forces of 25,000 times the force of gravity. The percentage of failure of the diodes was found to be less than 5%, whereas conventional prior art devices were found to have a failure rate in excess of 40% when subjected to centrifugal forces of the same intensity.

What is claimed is:

1. In the method of fabricating a semiconductor device the steps of contacting a surface of a body of semiconductor material with the end of an electrode having a curved section therein, bonding the end of the electrode to the body of semiconductor material, withdrawing a section of the electrode from the body of semiconductor material so as to partially straighten said curved section, and fixing said electrode in position with respect to said body of semiconductor material.

2. In the method of assembling an electrode and a body of semiconductor material mounted on a support the steps of placing one end of an electrode having a curved section intermediate its ends in contact with a surface of the body of semiconductor material, bonding said one end to the body of semiconductor material, increasing the distance between the end so bonded and the opposite end of the electrode to partially straighten said curved section, and fixing said electrode in position with respect to said support.

3. The method of assembling an electrode having a first straight section, a second straight section, and a curved section intermediate said straight sections to a body of semi-conductor material mounted on a support including the steps of placing the end of the first straight section of the electrode in contact with the surface of the body of semiconductor material, bonding the end of the electrode to the body of semiconductor material, withdrawing the second section from the body of semiconductor material while maintaining the bond between the electrode and the body of semiconductor material, and fixing said second section of the electrode in position with respect to the support.

4. The method of assembling a catwhisker electrode having a first straight end section, a second straight end section attached to a lead, and a curved section intermediate said straight sections to a body of semiconductor material mounted on a support having an insulating portion including the steps of placing the end of the first straight section of the electrode in contact with a surface of the body of semi-conductor material with said straight section perpendicular to the surface, passing electrical current through the electrode and the body of semiconductor material in order to bond the electrode to the body of semiconductor material, withdrawing the lead from the body of semiconductor material while the end of the electrode remains bonded to the body of semiconductor material whereby said curved section of the electrode is partially straightened, and attaching said lead rigidly to the support in insulated relation to said body of semiconductor material whereby the sections of said electrode and said body of semiconductor material are fixed with respect to each other.

5. The method of assembling a catwhisker electrode having a first straight end section, a second straight end section parallel to said first section and attached to a lead, and a curved section intermediate said straight sections to a body of semiconductor material mounted on a support having an insulating portion, including the steps of placing the end of the first straight section of the electrode in contact with a surface of the body of semiconductor material with said straight section perpendicular to the surface, advancing the lead along a line parallel to said straight sections a predetermined distance toward said body of semiconductor material so as to compress the curved section of the electrode and press the end of the first straight section of the electrode against the surface of the body of semiconductor material, passing electrical current through the electrode and the body of semiconductor material in order to bond the electrode to the body of semiconductor material, withdrawing the lead from the body of semiconductor material along a line parallel to said straight sections a distance greater than said predetermined distance while the end of the electrode remains bonded to the body of semiconductor material whereby said curved section of the electrode is partially straightened, and attaching said lead rigidly to the support in insulated relation to said body of semiconductor material whereby the sections of said electrode and said body of semiconductor material are fixed with respect to each other.

References Cited in the file of this patent

UNITED STATES PATENTS

| | | |
|---|---|---|
| 2,615,965 | Amico | Oct. 28, 1952 |
| 2,832,016 | Bakolar | Apr. 22, 1958 |